Oct. 2, 1962    R. P. KULISEK    3,056,576
REPLACEABLE SEAT WASHER IN SPHERICAL PLUG VALVE
Filed Dec. 10, 1959

INVENTOR.
ROBERT P. KULISEK
BY William D. Carothers
HIS ATTORNEY

United States Patent Office 3,056,576
Patented Oct. 2, 1962

3,056,576
REPLACEABLE SEAT WASHER IN SPHERICAL PLUG VALVE
Robert P. Kulisek, Aliquippa, Pa., assignor to Homestead Valve Manufacturing Company, Coraopolis, Pa., a corporation of Pennsylvania
Filed Dec. 10, 1959, Ser. No. 858,687
5 Claims. (Cl. 251—315)

This invention relates generally to plug valves and more particularly to a plug valve of the spherical or ball type.

Spherical type plug valves are not new nor are they simple in design and it is the principal object of this invention to provide a simplified design in a spherical plug valve which renders the valve inexpensive to manufacture, rugged in service, with the parts readily replaceable by employing a soft plastic replaceable seat which not only seals the valve chamber but also functions to seal on the spherical plug itself.

Another object is the provision of a plug valve having a replaceable flexible seat that permits a readily replacement of the seat without removing parts of the valve from the piping circuit. This is accomplished by using the tailpieces removably secured to the valve body and between which a flexible seating member is mounted and is placed under sufficient compression to function as a seal in the seat but is removable by disjoining the valve body from the tailpieces which remain in a piping circuit for the purpose of replacing any worn parts. The worn parts would be the flexible plastic seating members which are preferably known under the trade name "Teflon" and which avoid wear on the spherical plug.

Another object is the provision of a plug valve having a replaceable seat formed of flowable material and wherein the seat functions as a seal and is compressed between two parts of the valve body which allows for one degree of compression to provide a body seal and another degree of compression to provide a seat between the plug and the body of the valve.

Other objects and advantages of this invention appear hereinafter in the following description and claims.

The accompanying drawings show for the purpose of exemplification without limiting this invention or the claims thereto, certain practical embodiments illustrating the principles of this invention; wherein FIG. 1 is a sectional view of a spherical type plug valve illustrating this invention.

Figure 1:
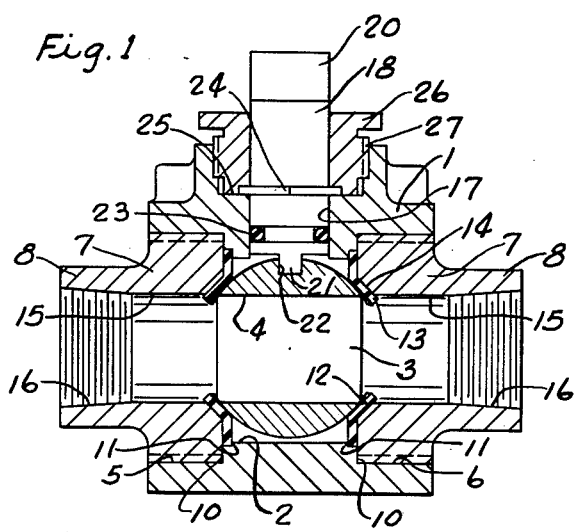
Figure 2:
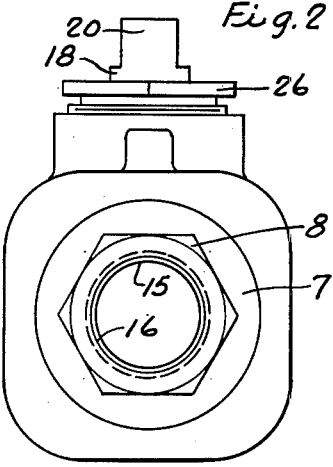
FIG. 2 is a view in end elevation of the structure shown in FIG. 1.

Referring to FIGS. 1 and 2 the valve body 1 has a central passage on valve chamber 2 extending through the valve body. This passage in its central portion is sufficiently large to receive the spherical valve or plug 3 which in turn is rotatably and operatively mounted in the intermediate space formed by the passage 2 and is provided with a flow passage 4 which is in registry with the passage 15 as shown in FIG. 1 but will close this passage when turned at 90°.

The passage 2 is larger at either end as indicated by the threaded bores 5 and 6 into which is screwed the closure means 7 that are threaded type tailpieces having their outer ends 8 made nonround so that a wrench may be applied thereto for screwing these closure members into place. At the inner end of the threaded bores 5 and 6 is a shoulder 10 which is a cooperative stop surface against which the closure means 7 must bottom. Inwardly of the shoulder 10 is a second or outwardly facing annular shoulder 11 for receiving the replaceable valve seat member 12 which can be made of rubber or any suitable elastomer but is preferably made of material such as "Teflon" that not only has the property of flowing for seal purposes but it also has a lubricant characteristic. The "Teflon" washer 12 as shown is a resilient sealing means and is preferably made from a material of approximately one-sixteenth of an inch which would be sixty-two thousandths of an inch thick. When the annular transverse face on the inner abutment ends of the tailpieces 7 bottom on the shoulder 10, the different distance between the shoulders 10 and 11 is forty-seven thousandths which represents a fifteen thousandths of an inch difference than the thickness of the washer 12 and the "Teflon" seated on the shoulder 11 is therefore squeezed fifteen thousandths of an inch to produce a seal between the tailpiece 7 and the body 1 of the valve.

The "Teflon" washer or resilient sealing means 12 is initially flat and is merely placed on the shoulder 11 without any pre-forming whatsoever. When the tailpiece is screwed home it deforms the washer 12 so that the surface adjacent the free end 13 fits the surface of the spherical plug 3 opposite to that of the concave valve seating surface 14 surrounding the flow passage 15 of the tailpiece and thus the spherical plug valve is resiliently supported between two resilient sealing washers backed by the concave valve seating surfaces 14.

The free end 13 represents the inner hole of the washer and is actually smaller than the passage 15 and projects beyond the concave surface 14 and the spherical surface of the plug 3 defining the passage 4 of the spherical plug as a tangential projection so as not to interfere with the operation of the spherical plug. This edge is actually free.

The surface 14 may be frusto conical or spherical in shape. However, the simpler form is frusto conical and when the tailpiece 7 is bottomed on the shoulder 10, the gauged distance between the surface of the spherical plug 3 and the frusto conical seat 14 is preferably from fifty-two to fifty-four thousandths of an inch which represents ten to eight thousandths of an inch difference than the thickness of the material of the washer 12. This difference in thickness permits the deformation of the "Teflon" removable seal seat and permits the outer surface to conform with both the spherical plug on one side and the sealing seat 14 on the other side. Thus the actual shape of the seat is not of major importance but because the material will seek its own seating conformity due to the compression subjected to the material causing it to flow.

The outer end of the passages 15 are threaded as indicated at 16. Once these threaded connections of the tailpieces 7 are connected in the system they may be permitted to stay there particularly if the threads 5 and 6 of the opposite tailpieces are of opposite hands so that by rotating the valve body 1 you unscrew both of these threaded sections 5 and 6 at the same time, whereas the threaded sections 16 remain intact with the piping.

The top of the valve body 1 is provided with a stem opening 17 for receiving the stem member 18 having a nonround portion for fitting a wrench as indicated at 20. This stem has a screwdriver section 21 that fits in a comparable slot 22 in the top of the spherical plug and holds the spherical plug in its proper position as well as providing an external means of rotating the spherical plug being held in place by the flexible seats 12. The stem 18 is also provided with an O-ring seal 23 and has a retaining ring 24 that seats on the bonnet shoulder of the valve 25 to determine the extent of the depth that the stem 18 descends into the spherical plug. A gland member 26 threadably engages the bonnet at 27 and bottoms on the shoulder 25 as well as forming a stop to engage the retaining ring 24.

Figure 3:
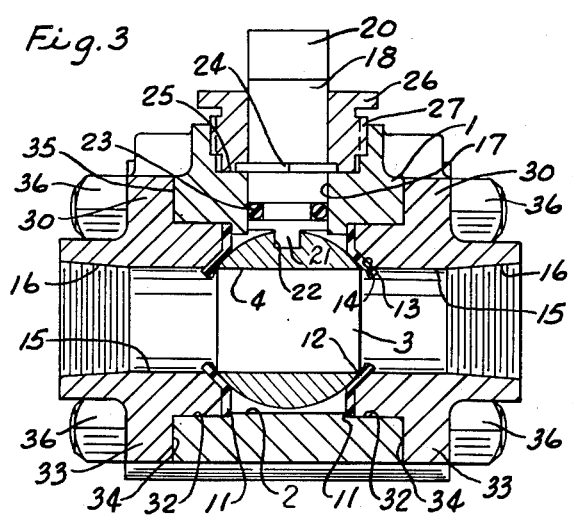
FIG. 3 is a sectional view illustrating another form of this invention.
Figure 4:
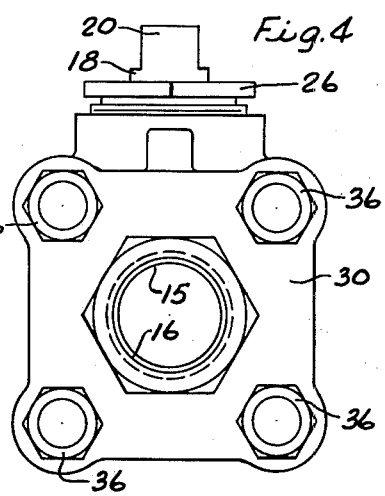
FIG. 4 is a view in end elevation of the structure shown in FIG. 3.

In the structure of FIG. 3 the tailpiece 30 is provided with the threads 16 on an integral annular projection that passes into the outer bore 32 of the valve body to engage the washer 12 seated on the shoulder 11. The tailpiece 30 is provided with an annular flange 33 forming a shoulder 34 that engages the outer surface 35 of the valve body which forms cooperative stop surfaces. The face 35 functions in the manner of the shoulder 10 in FIG. 1 in determining the pressure applied on the washer 12 at its seat 11 and also between the seat 14 of the tailpiece and the spherical plug 3. The abutment of the cooperative stop surfaces 34 and 35 thus determine the amount of pressure applied to compress the washer 12 on the seat 11 as well as against the seat 14 and this pressure is applied by the four bolts 36. Thus it is a simple matter to remove the bolts 36 to take off the tailpiece 30 without disturbing the piping connection with the threads 16.

Figure 5:
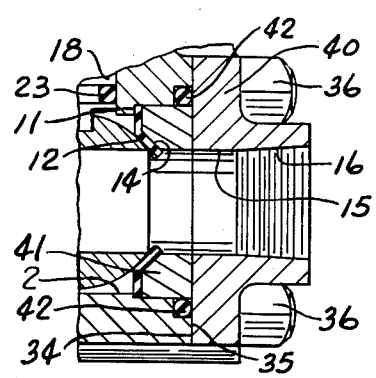
FIG. 5 is a partial sectional view showing another form of this invention.

In the structure of FIG. 5 the tailpiece 40 is made in two sections by making the neck or extension 31 a separate part as indicated by the abutment ring 41. The outer end of the ring 41 has a tranverse tailpiece engaging surface. This necessitates the use of an additional O-ring seal such as indicated at 42 to seal between the shoulder surfaces 34 and 35 on the valve body 1 and the tailpiece 40, otherwise this structure is the same.

I claim:

1. A spherical plug valve having a body with a valve chamber therethrough having an outwardly facing annular shoulder adjacent each end of said valve chamber, a spherical valve operatively mounted in said valve chamber between said shoulders and retained by a tailpiece which engages a stop surface at each end of the valve body and for connecting the valve chamber to a fluid system, characterized by an annular abutment extending into said valve chamber from each tailpiece and having an annular transverse face stopping short of said shoulder and an annular concave valve seating surface on the inner end of each abutment, and a resilient sealing means in the form of a washer seated on each shoulder, each washer having its perimetral portion clamped by said annular transverse face in sealed relation on each shoulder while the inner portion of said sealing washer is compressed between said concave valve seating surface on said abutments and said spherical valve to resiliently support the same for operation in said valve chamber.

2. The spherical plug valve of claim 1 characterized in that said annular abutment is an integral part of the tailpiece.

3. The spherical plug valve of claim 1 characterized in that said annular abutment is an independent ring engaged by each tailpiece.

4. The spherical plug valve of claim 1 characterized in that the inner edge of said resilient sealing washer extends inwardly beyond the surfaces of said spherical valve and said annular seating surfaces on each abutment.

5. A spherical plug valve having a body with a valve chamber therethrough, a spherical valve operatively mounted in said valve chamber and retained by at least one removable tailpiece which engages a stop surface on the end of said valve body and for connecting the valve chamber to a fluid system, characterized by an annular abutment ring removably mounted in said valve chamber on each side of said valve and having an annular concave valve seating surface on its inner end and a transverse tailpiece engaging surface on its outer end, and an annular resilient sealing means having a central opening with its adjacent annular portion of uniform thickness such as a washer and compressed by said tailpiece between said concave valve seating surface on said abutment ring and said spherical valve to resiliently support the same for operation in said valve chamber.

References Cited in the file of this patent

UNITED STATES PATENTS

| 2,698,731 | Koehler et al. | Jan. 4, 1955 |
| 2,890,856 | Clade | June 16, 1959 |

FOREIGN PATENTS

| 122,368 | Australia | Sept. 7, 1944 |
| 149,684 | Australia | July 13, 1950 |
| 759,218 | Great Britain | Oct. 17, 1956 |